Sept. 20, 1971  MAKOTO KIKUCHI  3,605,716
DOUBLE CIRCULAR GRINDSTONE DRESSING APPARATUS
Filed Feb. 27, 1970  2 Sheets-Sheet 1

United States Patent Office 3,605,716
Patented Sept. 20, 1971

3,605,716
DOUBLE CIRCULAR GRINDSTONE DRESSING APPARATUS
Makoto Kikuchi, Asahimachi, Japan, assignor to Toyoda Koki Kabushiki Kaisha, Kariya, Aichi Prefecture, Japan
Filed Feb. 27, 1970, Ser. No. 15,026
Claims priority, application Japan, Feb. 27, 1969, 44/14,960
Int. Cl. B24b 53/04
U.S. Cl. 125—11A
6 Claims

ABSTRACT OF THE DISCLOSURE

Apparatus for dressing pair of closely spaced adjacent grindstones of type having circular peripheral faces with different centers comprises framework with cutting table slidably mounted thereon for movement normal to axis of rotation of grindstones. Two swinging members are pivotally connected relative to cutting table and each member has arm depending therefrom with dressing tool connected to free end of each arm. Swinging members swing in plane parallel to horizontal plane defined by axis of rotation of grindstones and tip of each tool. Driving mechanism synchronously swings swinging members. Dressing tool on each swinging arm is positioned so that axis of one dressing tool and axis of rotation of grindstones are at right angles to each other when one of tools is midway between two closely spaced adjacent grindstones.

BACKGROUND OF THE INVENTION

The present invention relates to an apparatus for simultaneously dressing a pair of closely spaced adjacent grindstones.

In an apparatus for dressing grindstones fixed at close intervals along a wheel spindle and wherein the grindstones have different circular peripheral faces with different centers, the swinging arm that carries the diamond dresser swings around a vertical axis so that the dresser moves in a horizontal plane that contains the axis of rotation of the grindstones and the dresser tip. In view of the close intervals between the grindstones on the wheel spindle it is impossible to provide a plurality of swinging arms to match the grindstones being dressed because these arms would interfere with one another. In a dressing process using such a circular dressing apparatus the axis of rotation of the swinging arm is first shifted to the center of the circular peripheral face of one of the grindstones. After this the swinging arm is moved around its axis of rotation and the dresser attached to the arm operates on the circular peripheral face of the grindstone to dress it. This operation is repeated until each of the grindstones has been dressed. In each instance the axis of rotation of the swinging arm must be moved to the center of the circular peripheral face of each grindstone to be dressed.

The above procedure is extremely time consuming since the various grindstones must be separately dressed and the swinging arm must be shifted prior to each dressing operation. The above procedure is particularly inconvenient for a bearing grinder which must grind the work or the bearing in a short span of time. Also, when the dresser attached to the swinging arm is aligned so that the tip points to the axis of rotation of the swinging arm the dresser often interferes with an adjacent grindstone when the dresser approaches a point along its path of travel which is close to the adjacent grindstone.

Accordingly, it is an object of the present invention to provide a double-row circular dressing apparatus which functions in a highly satisfactory and efficient manner.

Another objection of the present invention is to provide a double-row circular dressing apparatus which is capable of dressing a pair of closely spaced grindstones of the type having circular peripheral faces with different centers.

SUMMARY OF THE INVENTION

In accordance with the present invention, an apparatus is provided for dressing a pair of closely spaced adjacent grindstones of the type having circular peripheral faces with different centers. The apparatus comprises a framework with a cutting table slidably mounted on the framework for movement normal to the axis of rotation of the grindstones. Two swinging members are pivotally connected relative to the cutting table. Each swinging member has an arm depending therefrom with a dressing tool connected to the free end of each arm. The swinging members move in a plane parallel to the horizontal plane defined by the axis of rotation of the grindstones and the tip of each tool. A driving mechanism is provided for synchronously swinging the swinging members. The dressing tool on each swinging arm is positioned so that the axis of one dressing tool and the axis of rotation of the grindstones are at right angles to one another when one of the tools is midway between the two closely spaced adjacent grindstones.

The driving mechanism may comprise a cylinder with a piston slidably mounted therein. A piston rod attached to the piston has a rack worm thereon, and each of the swinging members has a sector gear in engagement with the rack worm so that shifting movement of the piston rod causes the members to swing. Preferably, a pair of support plates are slidably connected to the cutting table for movement in a direction parallel to the axis of rotation of the grindstones. A pair of shafts are provided and one shaft is associated with each swinging member for pivotally connecting it to one of the support plates.

The rack worm on the piston rod has a pair of spaced apart threaded portions with thread directions opposite one another. Each threaded portion engages one of the sector gears. An arrangement is provided for rotating the piston rod so that rotation of the rod in one direction causes the swinging members to move toward one another while rotation of the rod in the other direction causes the members to move away from each other. An adjustable connection is located between each dressing tool and the arm of each swinging member for rotating each tool about an axis parallel to the axis of rotation of its respective support plate.

BRIEF DESCRIPTION OF THE DRAWING

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

Figure 1:
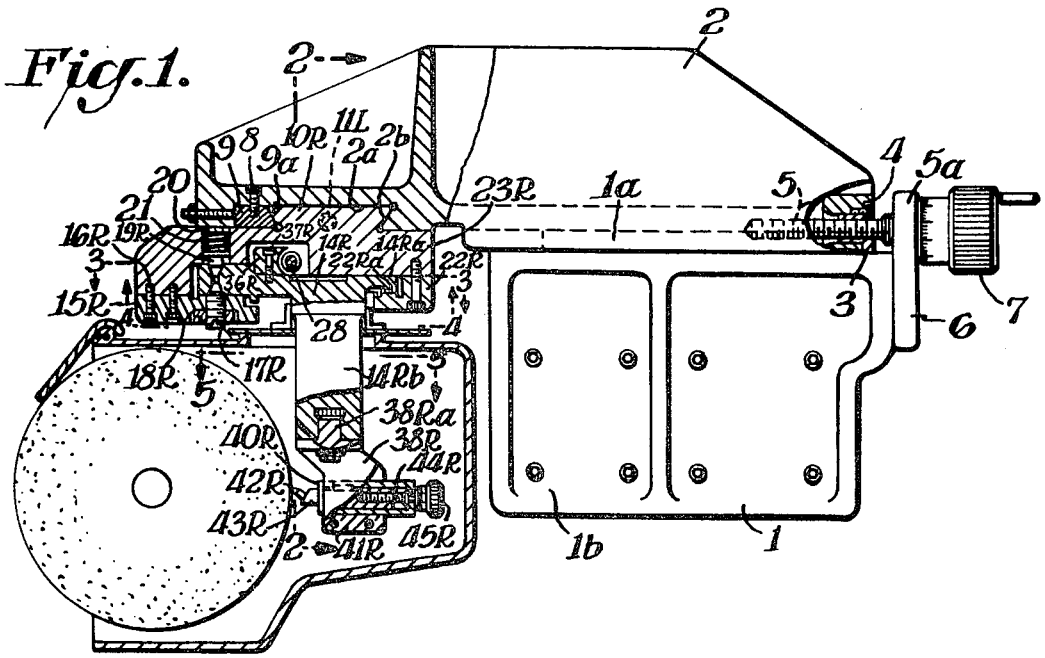
FIG. 1 is a sectional view of a double-row circular dressing apparatus according to the present invention.
Figure 2:
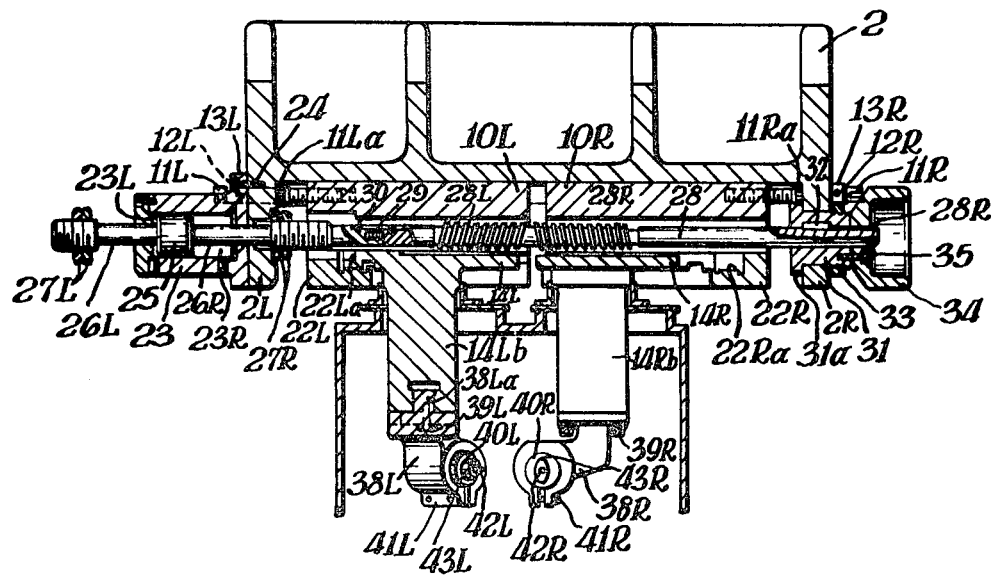
FIG. 2 is a sectional view taken along line 2—2 of FIG. 1.
Figure 3:
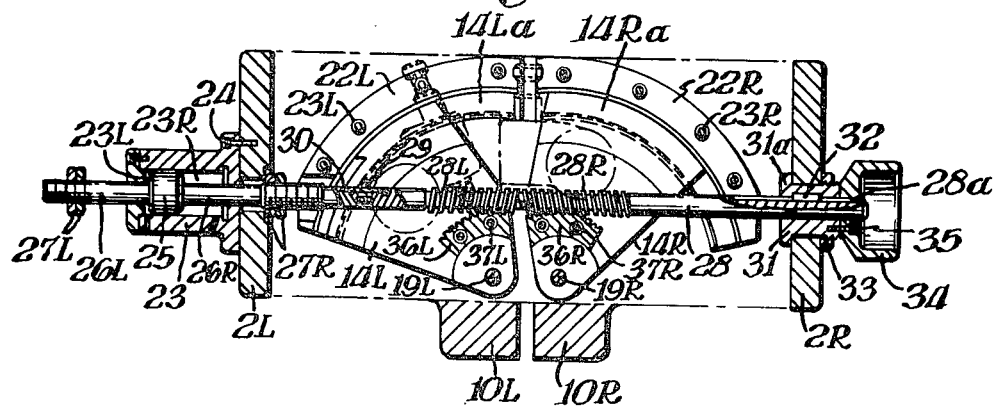
FIG. 3 is a sectional view taken along line 3—3 of FIG. 1.
Figure 4:
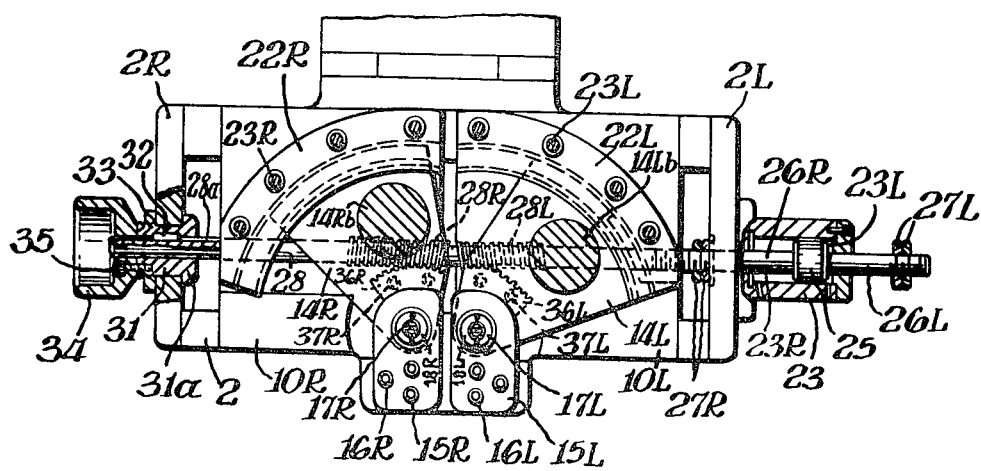
FIG. 4 is a sectional view taken along line 4—4 of FIG. 1.
Figure 5:
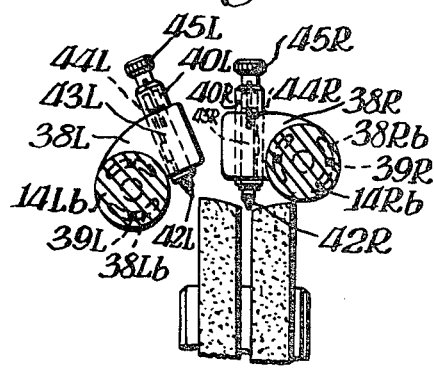
FIG. 5 is a sectional view taken along line 5—5 of FIG. 1.

Referring in more particularity to the drawings, a preferred embodiment of the present invention comprises a fitting stand or framework 1 rigidly fixed by bolts 1b to a grindstone table (not shown). A sliding part 1a is located on the upper side of the fitting stand 1 at right angles to the axis of rotation of the grindstones. A cutting table 2 is slidably mounted to the sliding part 1a of the fitting stand. An internally threaded sleeve 3 is fixed by bolts 4 to the back of the cutting table 2. The sleeve matingly surrounds a feed screw 5 disposed parallel to the sliding part 1a of the fitting stand 1. The feed screw 5 engages a support 6 bolted to the back of stand 1. A step 5a is cut in the feed screw 5 and a feed wheel 7 is connected to rotate the feed screw 5. Accordingly, when the wheel 7 is rotated, the cutting table 2 moves in a forward or backward direction along the sliding part 1a of the fitting stand 1.

A wide long groove 2a parallel to the axis of rotation of the grindstones is located at the forward underside of the cutting table 2. A sliding surface 2b provided on the back side of the groove 2a cooperates with the sliding surface 9a of a sliding plate 9 connected by bolts 8 to cutting table 2 to form a female dovetail groove.

The sliding surface of the female dovetail groove in the cutting table 2 mates with the sliding surface of the male dovetail groove formed on the upper surface of a pair of swinging tables 10L and 10R to provide a slidable connection between the swinging tables 10L, 10R and the cutting table 2. The sliding motion of the table is restricted by an arrangement which includes support portions 2L, 2R located on opposite sides of the cutting table 2. The opposite faces of each support portion 2L, 2R are located between the steps 11La, 11Ra of position adjusting screws 11L, 11R and collars 13L, 13R, fixed to the position adjusting screws by radially embedded pins 12L, 12R. Thus, the position adjusting screws 11L, 11R are rotatably supported and at the same time prevented from axial movement by the supports 2L, 2R. The position adjusting screws engage the swinging tables 10L, 10R for shifting them in a direction parallel to the axis of rotation of the grindstones.

Supports 15L, 15R are fastened by bolts 16L, 16R to the underside of the tables 10L, 10R for holding a pair of swinging members 14L, 14R. Shafts 17L, 17R with conical top portions fit into screw holes bored in the supports 15L, 15R. Fasteners 18L, 18R are provided at the lower ends of the swinging shafts 17L, 17R for fixing the shafts to the supports 15L, 15R after adjustment of the extent of projection of the shafts above the top surface of the supports 15L, 15R. Additional swinging shafts 19L, 19R are provided directly above the shafts 17L, 17R in the manner best shown in FIG. 1. The swinging shafts 19L, 19R are urged downwardly by springs 21 that react between lids 20 and the top surfaces of the swinging shafts 19L, 19R. Conical seats are provided on the top and bottom surfaces of the swinging members 14L, 14R for receiving the tips of the swinging shafts. Connection in this manner enables the swinging members to rotate in a horizontal plane.

Guide plates 22L, 22R are secured by bolts 23L, 23R to the underside of the swinging tables 10L, 10R. The guide plates have circular guide surfaces 22La, 22Ra. Circular portions 14La, 14Ra on the swinging members 14L, 14R are swingably supported by the guide surface 22La, 22Ra of the guide plates. Thus, the swinging members 14L, 14R are supported by the shafts 19L, 19R projecting from the swinging tables 10L, 10R, the swinging shafts 17L, 17R projecting from the supports 15L, 15R, and the guide surfaces 22La, 22Ra of the guide plates 22L, 22R. The swinging shafts 19L, 19R, 17L, 17R, define the axis of rotation of each swinging member 14L, 14R. When the center positions of the grindstone peripheries to be dressed change the centers of the swinging shafts 17L, 19L, 17R, 19R can be made to match the centers of the grindstone peripheries by turning the position-adjusting screws 11L, 11R. Movement of the screws 11L, 11R ultimately positions the axis of rotation of each swinging member directly above the center of the circular peripheral face of the grindstone to be dressed.

A cylinder 23 is provided for making the swinging members 14L, 14R swing. The cylinder is fastened by bolts 24 to the end face of the left support 2L of the cutting table 2. Screws are cut at the tips of the piston rods 26L, 26R of a piston 25 slidably fitted within the cylinder 23 so that movement of the piston is parallel to the sliding direction of the tables 10L, 10R. Screw rings 27L, 27R, are provided on the piston rod to regulate the stroke of the piston. A drive shaft 28 is screwed or otherwise fastened to the tip of the right piston rod 26R. A key 29 and a bolt 30 fix the drive shaft 28 to the piston rod 26R so that these members rotate together as a single unit. The right end of the drive shaft 28 extends into the interior opening of a flanged sleeve 31 rotatably supported by the right support 2R of the cutting table 2. A key 32 fixed within the inside of the flanged sleeve 31 and an axial groove 28a in the drive shaft 28 operates to connect the flanged sleeve 31 to the drive shaft. The shaft is free to slide relative to the flanged sleeve 31 but these elements rotate together as a unit. A ring 33 on the exteriorly threaded portion 31a of the sleeve 31 anchors the sleeve to the support portion 2R. A wheel 34 is fastened by bolts 35 to the flanged sleeve 31. Rotation of the wheel 34 causes the sleeve 31 and the drive shaft 28 to rotate with the wheel.

Rack worms 28L, 28R are cut in the drive shaft 28. The threaded portions which comprise the rack worms are cut in directions opposite to one another. The worms 28L, 28R mesh with gear sectors 36L, 36R fastened to the swinging members 14L, 14R by bolts 37L, 37R. Accordingly, when the swinging angle relative to the center of the grindstone periphery changes an adjustment can be made by turning the handle 34.

Arms 14Lb, 14Rb are located on the undersides of the swinging members 14L, 14R. The arms are disposed in a vertical direction. Dresser holders 38L, 38R are secured by bolts 39L, 39R to the undersides of the arms 14Lb, 14Rb. The holders may be adjusted by rotating them around the shafts 38La, 38Ra located at the free ends of the arms. Bolts 39L, 39R on the arms 14Lb, 14Rb are fitted into arcuate slots 38Lb, 38Rb on the dresser holders 38L, 38R. The dresser holders 38L, 38R fit the outer diameters of the holders 40L, 40R at closer positions than the axial centers of the arms 14Lb, 14Rb. Screw bolts 41L, 41R fix the holders 40L, 40R to the arms 14Lb, 14Rb. The holders 40L, 40R hold the fixing shafts 43L, 43R of the dressers 42L, 42R in an axially slidable manner by a key, as shown in FIG. 1. Screw threads 44L, 44R on shafts 43L, 43R operate to adjust the position of the tips 42L, 42R of the dressers. Rotation of the adjusting knobs 45L, 45R adjusts the position of the dresser tips.

When the table supports 10L, 10R are moved along the sliding surface of the female dovetail groove by the position adjusting screws 11L, 11R, the axial centers of the shafts 17L, 17R, 19L, 19R move with the tables for locating these shafts above the centers of the grindstone peripheries to be dressed. The dresser 42L is secured to the swinging arm 14Lb at an inclination to the line normal to the axis of rotation of the grindstone by the angle α (hereinafter referred to as angle of relief). As viewed in plan in FIG. 6, the angle of relief is formed by the line linking the tip of the dresser 42L at midpoint between grindstones and the center of the left grindstone periphery to be dressed. The other line which forms the angle of relief passes through the center of the left grindstone periphery to be dressed and is normal to the axis of rotation of the grindstone. This calibration is accomplished when the piston 25 of the cylinder 23 is at its starting position (left travel end after stroke adjustment). The dresser 42R located on the arm 14Rb opposite the right grindstone is fixed to the arm 14Rb in such a manner that the axis of the dresser 42R is perpendicular to the axis of rotation of the grindstone when the dresser is located midway between the grindstones to be dressed. Such location is accomplished while the piston 25 is at its starting position illustrated in FIG. 6. After the dressers 42L, 42R are adjusted, the knobs 45L, 45R are rotated until tips come into contact with the peripheries of the grindstones to be dressed. The swinging angles of the dressers 42L, 42R are slightly larger than the arc angle of the grindstone peripheries, while the stroke of the piston 25 is regulated by the rings 27L, 27R so that the swinging angle may not be so large as to make the dressers interfere with the adjoining other grindstones. Also, the wheel 34 controls the dressers 42L, 42R so that they may be situated slightly to the left of each of the adjacent grindstones when the piston 25 is at its starting position.

The operation of the double-row circular apparatus of the present invention is as follows. After the cutting table 2 is moved toward the grindstones by the dressing amount by rotating the cutting wheel 7, a pressurized fluid from a source not shown is supplied to the left chamber 23L of the cylinder 23. This causes the piston 25 to slide from its starting position toward its forward end or right travel end after stroke adjustment. Such movement of the piston 25 causes the drive shaft 28 to move in a similar direction. The sector gears 23L, 23R on the swinging members 14L, 14R mesh with the rack worms 28L, 28R on the drive shaft 28. This causes the members 14L, 14R to swing about the shafts 17L, 17R, 19L, 19R along the guide surfaces 22La, 22Ra of the guide plates 22L, 22R. The dressers 42L, 42R carried by the arms 14Lb, 14Rb of the swinging members 14L, 14R then swing around the shafts 17L, 17R, 19L, 19R at synchronized speeds to execute the grindstone dressing operation.

Figure 6:
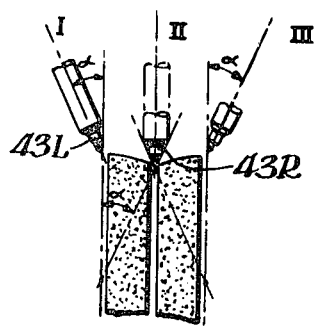
FIG. 6 illustrates the relationship between the grindstones and the diamond dressers of a double-row circular dressing apparatus according to the present invention.

As illustrated in FIG. 6, when the piston 25 of the cylinder 23 is situated at its starting position, the dresser fixing shaft 43L which carries the dresser 42L falls on line I while the dresser fixing shaft 43R carrying the dresser 42R falls on line II. When the piston 25 slides to its forward travel end, the dresser fixing shaft 43L shifts to line II while the dresser fixing shaft 43L shifts to line III. The axis of the dresser fixing shaft 43L at its forward travel end is normal to the axis of the rotation of the grindstones while the axis of the dresser fixing shaft 43R is inclined by the angle of relief α to the line normal to the axis of rotation of the grindstones.

Thus, according to the present invention, a universally available double-row circular dressing apparatus can execute dressing operations on grindstones having circular peripheral faces with different centers. The dressing time is substantially less than the time needed with existing machinery. Also, there is no interference with other adjoining grindstones when the dressers 42L, 42R are midway between adjacent grindstones.

What is claimed is:

1. Apparatus for dressing a pair of closely spaced adjacent grindstones of the type having circular peripheral faces with different centers comprising a framework, a cutting table slidably mounted on the framework for movement normal to the axis of rotation of the grindstones, motivating means for moving the cutting table relative to the grindstones, two swinging members each having an arm depending therefrom with a dressing tool connected to the free end of each arm, each swinging member being pivotally connected relative to the cutting table for swinging movement in a plane parallel to a horizontal plane defined by the axis of rotation of the grindstones and the tip of each tool, and driving means for synchronously swinging the swinging members, the dressing tool on each swinging arm being positioned so that the axis of one dressing tool and the axis of rotation of the grindstones are at right angles to each other when one of the tools is midway between the two closely spaced adjacent grindstones.

2. Apparatus as in claim 1 wherein the driving means comprises a cylinder with a piston slidably mounted therein, a piston rod connected to the piston having a rack worm thereon, and each of the swinging members having a sector gear in engagement with the rack worm whereby shifting movement of the piston rod causes the members to swing.

3. Apparatus as in claim 1 including a pair of support plates each slidably connected to the cutting table for movement in a direction parallel to the axis of rotation of the grindstones, and a pair of shafts, one associated with each swinging member for pivotally connecting each swinging member to one of the support plates.

4. Apparatus as in claim 3 wherein the driving means comprises a cylinder with a piston slidably mounted therein, a piston rod connected to the piston having a rack worm thereon, and each of the swinging members having a sector gear in engagement with the rack worm whereby shifting movement of the piston rod causes the members to swing.

5. Apparatus as in claim 4 wherein the rack worm on the piston rod has a pair of spaced apart threaded portions with thread directions opposite one another, each threaded portion engaging one of the sector gears, and means connected to rotate the piston rod whereby rotation of the rod in one direction causes the swinging members to move toward one another while rotation of the piston rod in the other direction causes the swinging members to move away from each other.

6. Apparatus as in claim 5 including an adjustable connection between each dressing tool and the arm of each swinging member of rotating each tool about an axis parallel to the axis of rotation of its respective support plate.

References Cited

UNITED STATES PATENTS

| | | | |
|---|---|---|---|
| 2,957,471 | 10/1960 | Kent | 125—11 |
| 3,269,381 | 8/1966 | Healy | 125—11 |
| 3,151,606 | 10/1964 | Hoglund | 125—11 |

HAROLD D. WHITEHEAD, Primary Examiner